US011611229B2

(12) United States Patent
Cook et al.

(10) Patent No.: US 11,611,229 B2
(45) Date of Patent: Mar. 21, 2023

(54) TECHNIQUES FOR DETECTING WIRELESS DEVICE CHARGING RECEIVER POSITION AND MAINTAINING UNINTERRUPTED WIRELESS POWER TRANSFER THROUGHOUT POSITION CHANGES OVER AN ARRAY OF TRANSMITTER COILS

(71) Applicant: Aptiv Technologies Limited, St. Michael (BB)

(72) Inventors: James R. Cook, Poland, OH (US); Nicolas A. Carbone, Cortland, OH (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 259 days.

(21) Appl. No.: 17/070,345

(22) Filed: Oct. 14, 2020

(65) Prior Publication Data

US 2022/0115896 A1    Apr. 14, 2022

(51) Int. Cl.
| | | |
|---|---|---|
| *H01M 10/46* | (2006.01) | |
| *H02J 7/04* | (2006.01) | |
| *H02J 50/10* | (2016.01) | |
| *H02J 50/40* | (2016.01) | |
| *H02J 7/00* | (2006.01) | |
| *H02J 50/90* | (2016.01) | |
| *H02J 50/80* | (2016.01) | |

(52) U.S. Cl.
CPC ............ *H02J 7/04* (2013.01); *H02J 7/00032* (2020.01); *H02J 7/0047* (2013.01); *H02J 50/10* (2016.02); *H02J 50/402* (2020.01); *H02J 50/80* (2016.02); *H02J 50/90* (2016.02)

(58) Field of Classification Search
CPC ........ H02J 7/04; H02J 7/00032; H02J 7/0047; H02J 50/10; H02J 50/80; H02J 50/90; H02J 50/402
USPC .......................... 320/107, 108, 116, 118, 119
See application file for complete search history.

(56) References Cited

U.S. PATENT DOCUMENTS

| | | |
|---|---|---|
| 9,112,363 B2 | 8/2015 | Partovi |
| 10,491,026 B2 | 11/2019 | Komulainen et al. |
| 2018/0097403 A1* | 4/2018 | Jung ........................ H02J 50/40 |

(Continued)

FOREIGN PATENT DOCUMENTS

WO    WO-2010118191 A1 * 10/2010 .............. H02J 5/005

*Primary Examiner* — Edward Tso
(74) *Attorney, Agent, or Firm* — RMCK Law Group, PLC

(57) ABSTRACT

Inductive charging techniques utilize a plurality of transmitter coils arranged in a predetermined configuration and each being configured to, when active, inductively transfer power to a receiver coil of a wireless device and a controller configured to control a charging session during which power is inductively transferred from at least one of the plurality of transmitter coils to the receiver coil of the wireless device, including monitoring electrical parameters of at least two transmitter coils of the plurality of transmitter coils, wherein the at least two monitored transmitter coils comprise at least one active transmitter coil, based on the monitoring, determining a position of the receiver coil relative to the plurality of transmitter coils, and selectively activating and/or deactivating at least one of the plurality of transmitter coils based on the monitoring when the position of the receiver coil changes to provide uninterrupted inductive power transfer.

20 Claims, 3 Drawing Sheets

FIG. 2

(56) References Cited

U.S. PATENT DOCUMENTS

2020/0212721 A1\* 7/2020 Narayana Bhat ..... B60L 53/122
2021/0281118 A1\* 9/2021 Smith ................. H02J 7/00034

\* cited by examiner

TECHNIQUES FOR DETECTING WIRELESS DEVICE CHARGING RECEIVER POSITION AND MAINTAINING UNINTERRUPTED WIRELESS POWER TRANSFER THROUGHOUT POSITION CHANGES OVER AN ARRAY OF TRANSMITTER COILS

FIELD

The present disclosure generally relates to inductive charging and, more particularly, to techniques for detecting wireless device charging receiver position and maintaining uninterrupted wireless power transfer throughout position changes over an array of transmitter coils, particularly for automotive applications.

BACKGROUND

Inductive charging is a type of wireless power transfer that uses electromagnetic induction to provide electrical energy to mobile or wireless devices (e.g., mobile phones). In automotive applications, a wireless charging pad typically comprises a plurality of smaller, closely spaced transmitter coils (i) to more closely match the size of wireless device receiver coils for better inductive coupling and (ii) to allow for spatial freedom in positioning the wireless device. To begin an inductive charging session, an initial ping operation is typically performed during which the transmitter coil with the best inductive coupling with the receiver coil is identified and activated. In automotive applications, the vehicle can experience forces (acceleration, braking, turning, etc.), which could cause the wireless device's position to change with respect to the wireless charging pad.

When this wireless device position movement occurs during an inductive charging session, a "hard handoff" can occur where the inductive charging session is interrupted, a new ping operation occurs, and a new inductive charging session begins. This also causes the wireless device, the wireless charging pad (or the vehicle itself), or both to make visual, audible, and/or tactile indications to the user, which is not a pleasant user experience, particularly while operating the vehicle. Thus, while conventional inductive charging systems, particularly for automotive applications, do work well for their intended purpose, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, an inductive charging system is presented. In one exemplary implementation, the inductive charging system comprises a plurality of transmitter coils arranged in a predetermined configuration and each being configured to, when active, inductively transfer power to a receiver coil of a wireless device, and a controller configured to control a charging session during which power is inductively transferred from at least one of the plurality of transmitter coils to the receiver coil of the wireless device, including: monitoring electrical parameters of at least two transmitter coils of the plurality of transmitter coils, wherein the at least two monitored transmitter coils comprise at least one active transmitter coil, based on the monitoring, determining a position of the receiver coil relative to the plurality of transmitter coils, and selectively activating and/or deactivating at least one of the plurality of transmitter coils based on the monitoring when the position of the receiver coil changes to provide uninterrupted inductive power transfer.

In some implementations, the electrical parameters comprise voltages at the at least two transmitter coils, and wherein the controller is configured to monitor the voltages of one active transmitter coil and one neighboring inactive transmitter coil. In some implementations, the controller is configured to monitor the voltages of the one active transmitter coil and the one neighboring inactive transmitter coil based on a three-winding transformer model that also takes into account electrical parameters of the receiver coil. In some implementations, the controller is further configured to temporarily reduce a magnitude of the inductive power transfer to the receiver coil for a period to temporarily decrease a current of the receiver coil to zero to avoid error in the determining of the receiver coil position. In some implementations, the controller is configured to, based on the monitoring, deactivate the active transmitter coil and activate the neighboring inactive transmitter coil by either: (i) reducing a power control operating point of the active transmitter coil, energizing the neighboring inactive transmitter coil to the reduced power control operating point, and then deenergizing the active transmitter coil, or (ii) simultaneously deenergizing the active transmitter coil and energizing the neighboring inactive transmitter coil.

In some implementations, the electrical parameters comprise at voltages, currents, or inductances of the two neighboring active transmitter coils. In some implementations, the controller is configured to monitor a ratio of the voltages, currents, or inductances of the two neighboring active transmitter coils and, when the position of the receiver coil moves away from a midline between the two neighboring active transmitter coils, the controller is configured to deactivate a distal one of the two neighboring active transmitter coils. In some implementations, the controller is further configured to: prior to the charging session, perform a ping operation on each of the plurality of transmitter coils to identify at least one of the plurality of transmitter coils having high levels of inductive coupling, and initiating the charging session by activating the at least one identified transmitter coil from the ping operation. In some implementations, the predetermined configuration is a linear, overlapping arrangement of the plurality of transmitter coils.

According to another aspect of the present disclosure, an inductive charging method is presented. In one exemplary implementation, the method comprises providing a plurality of transmitter coils arranged in a predetermined configuration and each being configured to, when active, inductively transfer power to a receiver coil of a wireless device, and controlling, by a controller, a charging session during which power is inductively transferred from at least one of the plurality of transmitter coils to the receiver coil of the wireless device, including: monitoring, by the controller, electrical parameters of at least two transmitter coils of the plurality of transmitter coils, wherein the at least two monitored transmitter coils comprise at least one active transmitter coil, based on the monitoring, determining, by the controller, a position of the receiver coil relative to the plurality of transmitter coils, and selectively activating and/or deactivating, by the controller, at least one of the plurality of transmitter coils based on the monitoring when the position of the receiver coil changes to provide uninterrupted inductive power transfer.

In some implementations, the electrical parameters comprise voltages at the at least two transmitter coils, and wherein the method comprises monitoring, by the controller, the voltages of one active transmitter coil and one neighboring inactive transmitter coil. In some implementations, the monitoring of the voltages of the one active transmitter coil and the one neighboring inactive transmitter coil is based on a three-winding transformer model that also takes into account electrical parameters of the receiver coil. In some implementations, the method further comprises temporarily reducing, by the controller, a magnitude of the inductive power transfer to the receiver coil for a period to temporarily decrease a current of the receiver coil to zero to avoid error in the determining of the receiver coil position. In some implementations, based on the monitoring, deactivating, by the controller, the active transmitter coil and activating, by the controller, the neighboring inactive transmitter coil is performed by either: (i) reducing a power control operating point of the active transmitter coil, energizing the neighboring inactive transmitter coil to the reduced power control operating point, and then deenergizing the active transmitter coil, or (ii) simultaneously deenergizing the active transmitter coil and energizing the neighboring inactive transmitter coil.

In some implementations, the electrical parameters comprise at voltages, currents, or inductances of the two neighboring active transmitter coils. In some implementations, the monitoring comprises monitoring, by the controller, a ratio of the voltages, currents, or inductances of the two neighboring active transmitter coils and, when the position of the receiver coil moves away from a midline between the two neighboring active transmitter coils, deactivating, by the controller, a distal one of the two neighboring active transmitter coils. In some implementations, the method further comprises: prior to the charging session, performing, by the controller, a ping operation on each of the plurality of transmitter coils to identify at least one of the plurality of transmitter coils having high levels of inductive coupling, and initiating the charging session by activating the at least one identified transmitter coil from the ping operation. In some implementations, the predetermined configuration is a linear, overlapping arrangement of the plurality of transmitter coils.

According to yet another aspect of the present disclosure, an inductive charging system is presented. In one exemplary implementation, the inductive charging system comprises a plurality of transmitter coil means arranged in a predetermined configuration and each for, when active, inductively transferring power to a receiver coil means of a wireless device means, and a controller means for controlling a charging session during which power is inductively transferred from at least one of the plurality of transmitter coil means to the receiver coil means of the wireless device means, including: monitoring electrical parameters of at least two transmitter coil means of the plurality of transmitter coil means, wherein the at least two transmitter coil means comprise at least one active transmitter coil means, based on the monitoring, determining a position of the receiver coil means relative to the plurality of transmitter coil means, and selectively activating and/or deactivating at least one of the plurality of transmitter coil means based on the monitoring when the position of the receiver coil means changes to provide uninterrupted inductive power transfer.

In some implementations, the electrical parameters comprise voltages at the at least two transmitter coil means, and the controller means is configured to monitor the voltages of one active transmitter coil means and one neighboring inactive transmitter coil means, and based on the monitoring, deactivate the active transmitter coil means and activate the neighboring inactive transmitter coil means by either: (i) reducing a power control operating point of the active transmitter coil means, energizing the neighboring inactive transmitter coil means to the reduced power control operating point, and then deenergizing the active transmitter coil means, or (ii) simultaneously deenergizing the active transmitter coil means and energizing the neighboring inactive transmitter coil means.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously discussed, a "hard handoff" during an inductive charging session (also referred to more simply herein as "charging session") not only causes interrupted wireless power transfer, but could also be unpleasant or annoying for a user, particularly for a driver that is actively operating a vehicle. It is also possible that the receiver coil may move to a position between two transmitter coils where both coils have about the same level of inductive coupling, but the inductive coupling is not high enough in either in order to provide the maximum level of power transfer that the power receiver supports. In this case, either (1) the receiver coil will be powered at a reduced level, (2) the charging session will not start, or (3) it is possible that charging state may be astable (i.e., periodically transitioning between charging and not charging). During an astable charging state, either the wireless device, the wireless charging pad (or the vehicle itself, for automotive applications), or combinations thereof may make a visible, audible, or tactile indication to the user.

Wireless charging pads and/or wireless devices could purposely hide these "hard handoff" or astable charging state indications from the user, but the charging sessions would still be interrupted. Another alternative would be to utilize a single transmitter coil, but this could require precise physical positioning by the user which is cumbersome. Accordingly, improved inductive charging systems and methods are presented that provide for uninterrupted wireless power transfer when a receiver coil moves relative to a plurality of transmitter coils of a wireless charging pad. As discussed above, these improved inductive charging systems and methods could be particularly useful in automotive applications where vehicle forces (acceleration, braking, turning, etc.) could cause the wireless device to move relative to the wireless charging pad.

Figure 1A:
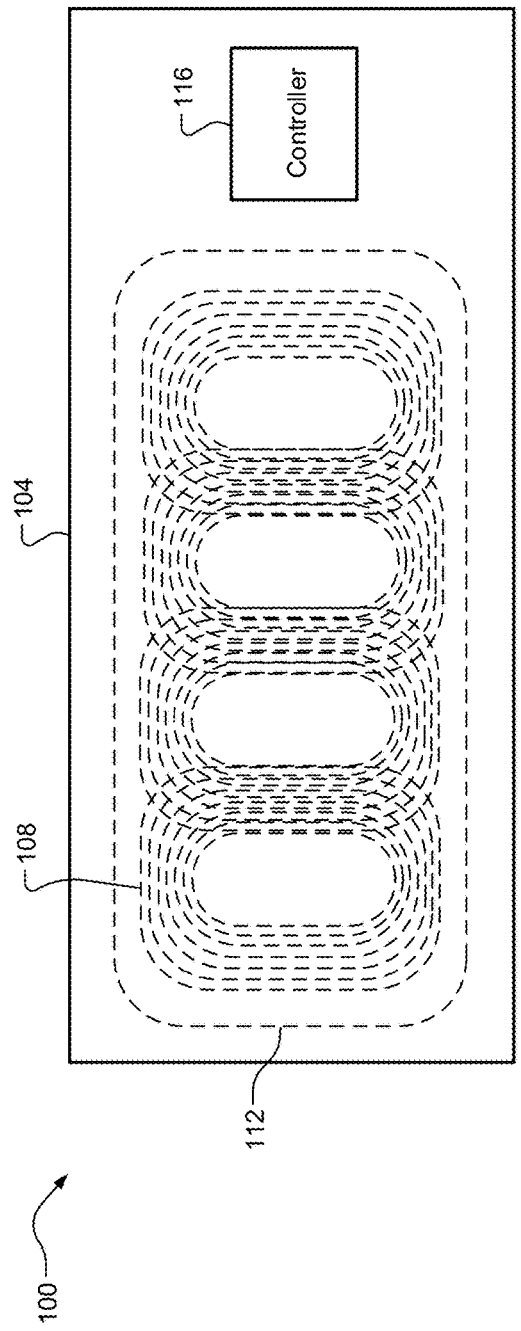
FIGS. 1A-1B are overhead views of an example wireless charging pad comprising a plurality of transmitter coils arranged in a linear, overlapping arrangement according to some implementations of the present disclosure and an example wireless device comprising a receiver coil.
Figure 1B:
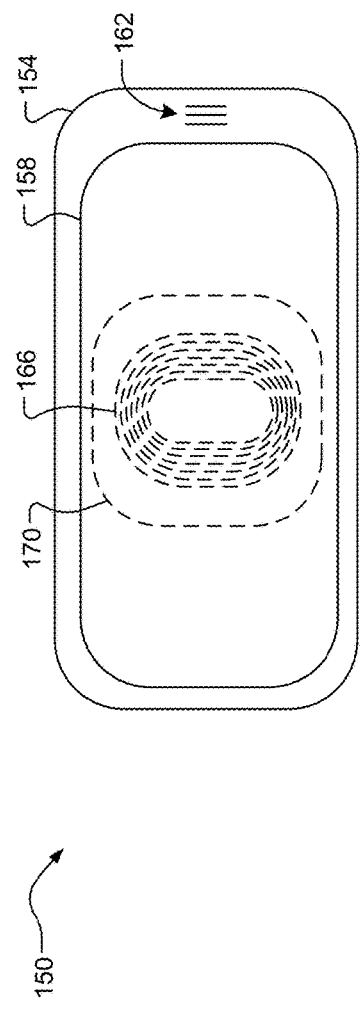

FIGS. 1A-1B illustrate an example wireless charging pad 100 according to some implementations of the present disclosure and an example wireless device 150 (e.g., a mobile phone). The wireless charging pad 100 comprises a housing 104 that houses a plurality of transmitter coils 108 arranged atop a sheet of ferrite material 112. While a linear, overlapping configuration of the plurality of four transmitter coils 108 is illustrated and specifically discussed herein, it will be appreciated that the techniques of the present disclosure could be applicable to other numbers and/or configurations of a plurality of transmitter coils (e.g., a two-dimensional array). A controller 116 controls operation of the wireless charging pad 100, which primarily includes monitoring electrical parameters of and selectively activating/deactivating (i.e., providing power to) the plurality of transmitter coils 108. While the wireless device 150 is shown to be a mobile phone, it will be appreciated that the wireless device 150 could be any suitable device having a receiver coil configured to receive inductive power. The wireless receiver device 150 comprises a housing 154 that houses various user-facing components (a touch display 158, a speaker/microphone 162, etc.) as well as a receiver coil 166 arranged atop a sheet of ferrite material 170.

Figure 2:
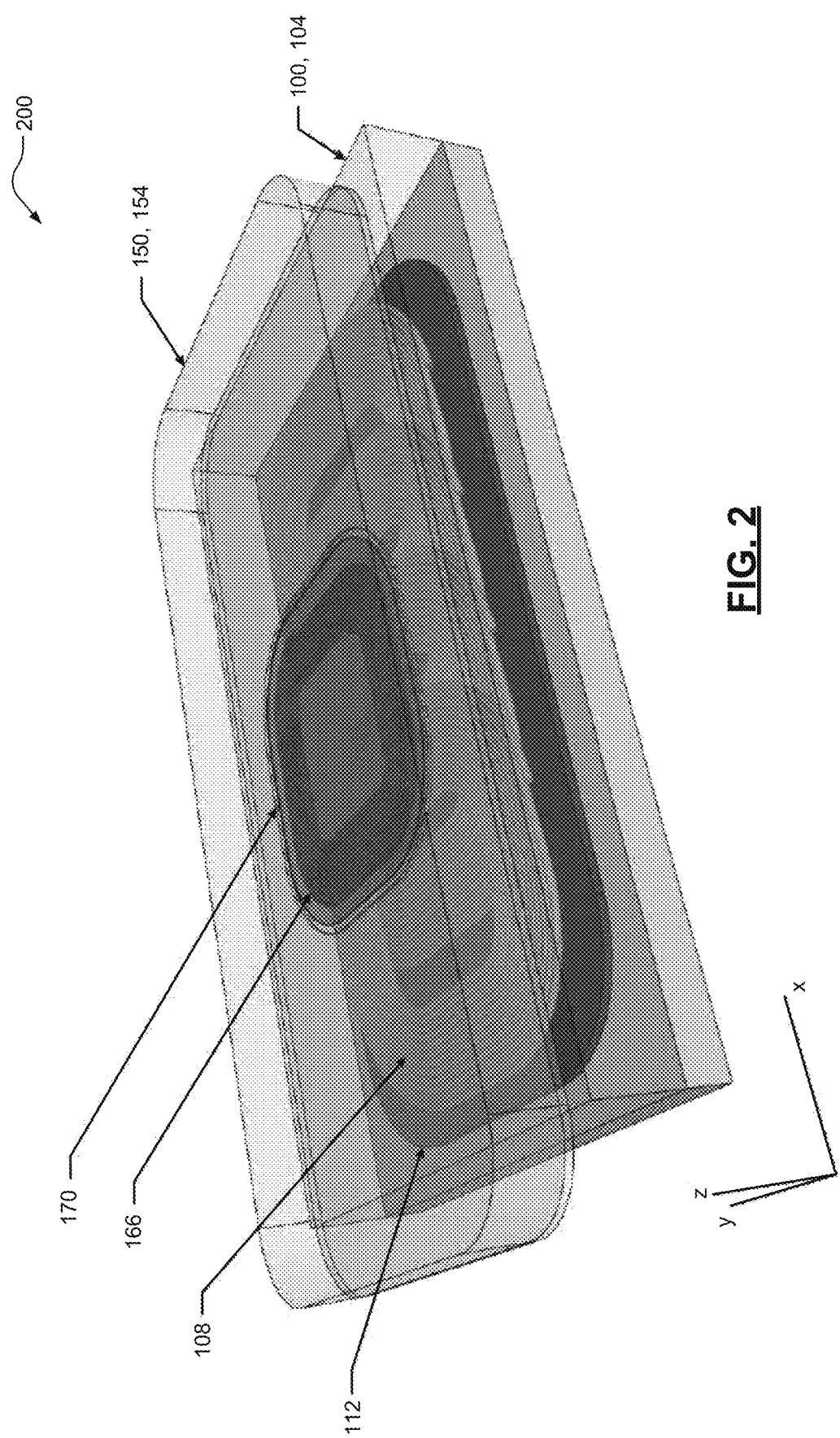
FIG. 2 is three-dimensional view of the wireless device of FIG. 1B having been placed on the wireless charging pad of FIG. 1A according to some implementations of the present disclosure.

Referring now to FIG. 2, a three-dimensional (3D) view 200 of the wireless device 150 having been placed on the wireless charging pad 100 and the subsequent component control according to the principles of the present disclosure is illustrated. In the bottom-left, x/y/z axes are indicated and referenced in greater detail below. According to the techniques of the present disclosure, the location of the receiver coil 166 can be determined during a charging session with respect to the long axis (x-axis) of the plurality of transmitter coils 108 regardless of the location of the receiver coil 166 with respect to the short axis (y-axis) of the plurality of transmitter coils 108 or the vertical separation between the top surface of the wireless charging pad 100 (also referred to as the "interface surface") and the bottom surface of the wireless device (z-axis) by using electrical measurements of the plurality of transmitter coils 108. Uninterrupted transition of power transfer from a single active transmitter coil 108 to a new single active transmitter coil 108, or from a single active transmitter coil 108 to an additional adjacent active transmitter coil 108 (2-coil active), or from two active adjacent transmitter coils 108 to a single active transmitter coil 108 is also presented.

The ability to locate the receiver coil on the interface surface and to choose the most appropriate transmitter coil(s) 108 to energize for any particular receiver coil 166 location such that power transfer to the receiver coil 166 is never interrupted may also be called "soft handoff". Since power transfer is never interrupted, there will never be a visible, audible, or tactile indication to the user about the time of transition, and thus user experience is improved. Additionally, since these techniques provide a way to transition from a single active transmitter coil 108 to an additional adjacent active transmitter coil 108 (2-coil active), user experience is improved as there is a greater likelihood that a power transfer contract can be maintained in this position and with higher levels of power transfer than with a single active transmitter coil 108.

In a traditional power receiver model, the receiver coil 166 typically utilizes the contiguous sheet of ferrite material 170 as shielding between the receiver coil 170 and the metal components of the wireless device 150. This reduces eddy current losses in metal components of the wireless device 150 as most of the magnetic flux is channeled through the sheet of ferrite material 170, and also raises the inductance of the receiver coil 166, which improves power transfer efficiency. The sheet of ferrite material 170 typically covers the entire receiver coil 166 area and goes beyond the outer edge of the coil area by, for example, 1-4 millimeters. Additionally, the wireless device 150 typically further comprises a battery cell, a printed circuit board assembly (PCBA), and other metallic components (not shown) with extents covering the full area of the wireless device 150. One form of the transformer equation in the non-ideal case where coupling is not equal to one is as follows:

$$\frac{V_2}{V_1} = k * \sqrt{\frac{L_2}{L_1}}, \quad (1)$$

where $V_1$ and $V_2$ are the voltage magnitude of the primary and secondary transformer coils, respectively, $L_1$ and $L_2$ are the inductances of the primary and secondary transformer coils, respectively, and k is the value of inductive coupling between the primary and secondary transformer coils. Equation 1 describes the electromagnetic relationship between any pair of coils that are inductively coupled, including adjacent transmitter coils 108.

First, consider the case where there is one active transmitter coil 108 whose voltage magnitude is $V_1$ and whose inductance is $L_1$, and one adjacent transmitter coil 108 similar to the first whose voltage magnitude is $V_2$ and whose inductance is $L_2$, and the pair of transmitter coils 108 have a magnitude of inductive coupling k. The inductance of a transmitter coil 108 increases in the presence of ferrite (such as that found in the wireless device 150) and decreases in the presence of non-ferrous metal. As the inductance of a transmitter coil 108 typically dominates the magnitude of the impedance, there can be a significant positive shift in the impedance of a transmitter coil 108 when a metallic area moves away from the transmitter coil 108 and a ferrite area (hereinafter referenced as "ferrite sheet 170") moves over the transmitter coil 108, and vice-versa. Additionally, as ferrite tends to direct the path of magnetic flux, when the ferrite sheet 170 is positioned over an area where two transmitter coils 108 overlap, the inductive coupling between those two transmitter coils 108 will increase. Conversely, for a pair of adjacent transmitter coils 108, if the ferrite sheet 170 is positioned away from the area where the two transmitter coils 108 overlap, the coupling between the two adjacent transmitter coils 108 will tend to decrease.

When ferrite moves away from pair of transmitter coils 108 along the short axis (y-axis) of the interface surface or along the vertical axis (z-axis) away from the interface surface, depending on the initial position of the ferrite sheet 170, the coupling will likely stay the same or reduce; and the inductances of the transmitter coils 108 will likely reduce by an equal amounts, or the inductance of the active transmitter coil 108 may reduce by a larger amount than the inactive transmitter coil 108. Thus, the ratio $V_2/V_1$ will tend to increase when the ferrite sheet 170 is positioned over the point where the two transmitter coils 108 overlap and will tend to decrease when the ferrite sheet 170 is positioned away from the point where the two transmitter coils 108 overlap. As the ratio is a function of inductances and coupling, the magnitude of the ratio does not change significantly with changes in the active transmitter coil 108 voltage. The ratio is likely to decrease or stay the same when the ferrite sheet 170 is pulled away from the transmitter coil 108 surface or when it is moved along the short axis (y-axis).

It is worth noting that the aforementioned technique is valid only in the case where the receiver coil 166 has a low value of inductance or a low value of current flowing through it; however, this may not always be the case during an active charging session. In order to understand this, (1) the active transmitter coil 108, (2) the inactive transmitter coil(s) 108, and (3) the receiver coil 166 can be modelled as a three-winding transformer. The active transmitter coil 108 generates flux proportional to its inductance ($L_1$) and coil current ($I_1$). Some amount of this flux is coupled ($k_{12}$) to the inactive transmitter coil 108. By Faraday's Law, the coupled flux induces a voltage on the inactive transmitter coil 108 that is proportional to its inductance ($L_2$) and the amount of flux coupled ($k_{12}$). Per equation (1), this component of voltage ($V_2(1)$) is defined by the following equation:

$$V_2(1) = V_1 * k_{12} * \sqrt{\frac{L_2}{L_1}}. \quad (2)$$

Likewise, the coupled flux induces a voltage ($V_3(1)$) on the receiver coil 166 that is proportional to its inductance ($L_3$) and the amount of coupled flux ($k_{13}$):

$$V_3(1) = V_1 * k_{13} * \sqrt{\frac{L_3}{L_1}}. \quad (3)$$

This receiver voltage $V_3(1)$ behaves like a voltage source, from which current is pulled by the receiver circuit. This series current through the receiver coil 166 generates additional flux that is proportional to the change in flux due to the primary transmitter coil 108. Some amount of the receiver flux is also coupled ($k_{23}$) to the inactive transmitter coil 108, and the coupled flux will induce a voltage ($V_2(3)$) on the inactive transmitter coil 108 that is proportional to its inductance ($L_2$) and the amount of coupled flux $k_{23}$. This component of voltage is defined by the following equation:

$$V_2(3) = V_3 * k_{23} * \sqrt{\frac{L_2}{L_3}}. \quad (4)$$

By the principle of superposition, the voltage on the inactive transmitter coil 108 will be the sum of $V_3(1)$ and $V_3(2)$, while being mindful of the phase of these two voltage components. Since the wireless charging pad 100 (e.g., controller 116) cannot directly measure $k_{23}$, $L_3$, or $V_3$, the only way to avoid error in receiver coil position measurement when using coil voltages is to cause the receiver coil 166 current to be zero. This can include reducing power for a short period of time in order to reverse bias receiver rectifier diodes in the wireless device 150, which disconnects the receiver load in the wireless device 150 from the receiver coil 166. During this window, the receiver coil 166 current drops to zero, then the component of voltage across the inactive transmitter coil 108 due to coupling with the receiver coil 166 will be zero.

Next, consider the case where there are three or more similar transmitter coils 108 in an array. In this case, calibration of the receiver position metric may be made easier and horizontal movement can be differentiated to an even greater degree from a vertical or lateral movement. We can compute the difference in ratios of the two adjacent transmitter coils 108 with respect to the active transmitter coil 108 for active transmitter coils 108 not at the end of the array and we can compute the difference in ratios of the adjacent transmitter coil 108 and the next distal transmitter coil 108 with respect to the active transmitter coil 108 for active transmitter coils 108 at the end of the array. Since the ratios will change by a similar amount in the case of vertical or lateral movement, but will change in an inverse way in the case of horizontal movement, we can deduce the horizontal position of the receiver coil 166 in a way that is unaffected by vertical or lateral movement of the receiver coil 166.

As an alternative to the use of Equation 1, and in the case where a wireless charging pad 100 (e.g., the controller 116) has the capability of measuring active and inactive transmitter coil 108 inductances, then an alternative method would be to use the ratio of inductances of adjacent transmitter coils 108. For similar transmitter coils 108, the ratio will be near a value of one when the receiver coil 166 is positioned directly between two transmitter coils 108. The ratio will increase if the receiver coil 166 moves toward the transmitter coil 108 whose inductance is in the numerator of the ratio, and decrease if the receiver coil 166 moves away from the transmitter coil 108 whose inductance is in the numerator of the ratio, and vice-versa for the transmitter coil 108 whose inductance is in the denominator of the ratio.

In the case where there are two active transmitter coils 108 (also referred to herein as "two active coil operation"), then the ratio of inductances, voltages, or currents of the two active transmitter coils may be used to deduce the position of the receiver coil (see Table 1 below, which includes Equation 5).

TABLE 1

| Two Active Coil Operation | Result | Receiver Coil Location |
|---|---|---|
| $\frac{I_1}{I_2} = \frac{V_2}{V_1} \approx \frac{L_2}{L_1}$ (5) | >1 | Off midline, more toward Coil 2 |
| | =1 | Along midline directly between Coils 1 and 2 |
| | <1 | Off midline, more toward Coil 1 |

For similar transmitter coils 108, the ratio will be near a value of one when the receiver coil 166 is positioned directly between two transmitter coils 108. The ratio will increase if the receiver coil 166 moves toward the transmitter coil 108 whose inductance is in the numerator of the ratio, and decrease if the receiver coil 166 moves away from the transmitter coil 108 whose inductance is in the numerator of the ratio, and vice-versa for the transmitter coil 108 whose inductance is in the denominator of the ratio. These techniques described above could also be used with a two-dimensional transmitter coil array to deduce the position of the receiver coil 166 along both the x-axis and the y-axis. Differentiation of other causes of transmitter coil impedance changes, such a foreign object introduction, should also be performed.

Techniques for maintaining uninterrupted power transfer will now be discussed in greater detail. In the case where one power transmitter coil 108 is active, when the receiver coil 166 moves horizontally along the long axis (x-axis), then it will reach a point where coupling between the receiver coil 166 and the active transmitter coil 108 reduces to a point where activation of an additional transmitter coil 108 adjacent to the active transmitter coil 108 will improve system performance. In this case, the wireless charging pad 100 (e.g., controller 116) may implement a reduction in the power control operating point before immediately energizing the adjacent transmitter coil 108 in addition to the first with both being powered at the same operating point. The wireless device 150 (e.g., via its controller, not shown) may subsequently call for an adjustment of the operating point to return to its target power level. In this way, any risk of exceeding voltage limits of the receiver coil 166 is mitigated and power transfer to the receiver coil 166 is uninterrupted. Alternatively, the wireless charging pad 100 may forgo activation of two transmitter coils 108 simultaneously and transition immediately to an alternate adjacent transmitter coil 108. This may be preferred in cases of rapid wireless device 150 movement, or in cases of system optimization such that two transmitter coil 108 activation is not possible.

In the case where two adjacent power transmitter coils 108 are active, when a the receiver coil 166 moves horizontally along the long axis (x-axis), then it will reach a point where coupling between the receiver coil 166 and the pair of active transmitter coils 108 reduces to a point where deactivation of the active transmitter coil 108 distal to the receiver coil 166 will improve system performance. In this case, the wireless charging pad 100 (e.g., controller 116) may implement an increase in the power control operating point before immediately de-energizing the distal active transmitter coil 108 in the pair. The wireless device 150 (e.g., via its controller) may subsequently call for an adjustment of the operating point to return to its target power level. In this way, power transfer to the receiver is uninterrupted. Again, these techniques described above could also be used with a two-dimensional transmitter coil array to maintain uninterrupted charging with two-dimensional receiver coil movement over the two-dimensional transmitter coil array.

Figure 3:
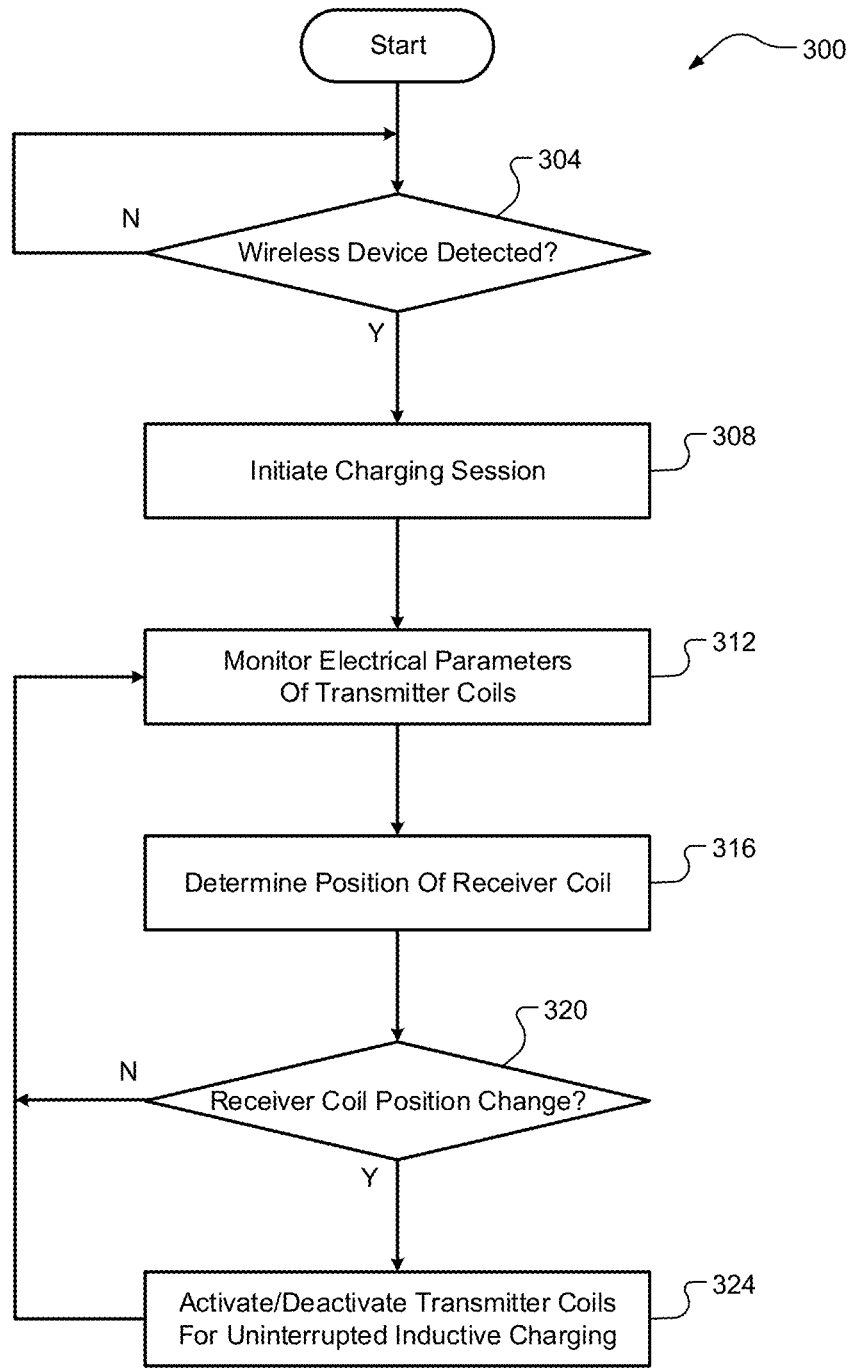
FIG. 3 is a flow diagram of an example inductive charging method according to some implementations of the present disclosure.

Referring now to FIG. 3, a flow diagram of an example inductive charging method 300 according to some implementations of the present disclosure is illustrated. At 304, the controller 116 attempts to detect whether the wireless device 150 (and more particularly, its receiver coil 166) is present on the wireless charging pad 100. When true, the method 300 proceeds to 308. Otherwise, the method 300 ends or returns to 304. At 308, the controller 116 initiates a charging session during which power is inductively transferred from at least one of the plurality of transmitter coils to the receiver coil of the wireless device. This could include, for example, performing a ping operation during which one or more transmitter coils of the plurality of transmitter coils 108 having the highest levels of inductive coupling are identified and activated. During this initiation of the charging session, the controller 116 could also determine an initial position of the receiver coil 166. At 312, during the charging session, the controller 116 monitors electrical parameters of at least two transmitter coils of the plurality of transmitter coils 108, wherein the monitored transmitter coils comprise at least one active transmitter coil. At 316, the controller 116 determines the position of the receiver coil 166 relative to the plurality of transmitter coils 108. At 320, the controller 116 determines whether the position of the receiver coil 166 has changed such that an adjustment to the charging session should occur. For example, this could be when the receiver coil 166 moves more than a certain amount such that the monitored electrical parameters indicate that an adjustment should occur. When true, the method 300 proceeds to 324. Otherwise, the method 300 returns to 312 and the process continues until the charging session is terminated. At 324, the controller 116 selectively activates and/or deactivates at least one of the plurality of transmitter coils to provide uninterrupted inductive power transfer based on monitoring when the position of the receiver coil 166 has changed. Depending on whether one or multiple transmitter coils are active or now desired to be active, this could include activation and/or deactivation. The method 300 then returns to 312 and the process continues until the charging session is terminated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An inductive charging system, comprising:
a plurality of transmitter coils arranged in a predetermined configuration and each being configured to, when active, inductively transfer power to a receiver coil of a wireless device; and
a controller configured to control a charging session during which power is inductively transferred from at least one of the plurality of transmitter coils to the receiver coil of the wireless device, including:
monitoring electrical parameters of at least two transmitter coils of the plurality of transmitter coils, wherein the at least two monitored transmitter coils comprise at least one active transmitter coil;
based on the monitoring, determining a position of the receiver coil relative to the plurality of transmitter coils; and
at least one of selectively activating and deactivating at least one of the plurality of transmitter coils based on the monitoring when the position of the receiver coil changes to provide uninterrupted inductive power transfer.

2. The inductive charging system of claim 1, wherein the electrical parameters comprise voltages at the at least two transmitter coils, and wherein the controller is configured to monitor the voltages of one active transmitter coil and one neighboring inactive transmitter coil.

3. The inductive charging system of claim 2, wherein the controller is configured to monitor the voltages of the one active transmitter coil and the one neighboring inactive transmitter coil based on a three-winding transformer model that also takes into account electrical parameters of the receiver coil.

4. The inductive charging system of claim 3, wherein the controller is further configured to temporarily reduce a magnitude of the inductive power transfer to the receiver coil for a period to temporarily decrease a current of the receiver coil to zero to avoid error in the determining of the receiver coil position.

5. The inductive charging system of claim 2, wherein the controller is configured to, based on the monitoring, deactivate the active transmitter coil and activate the neighboring inactive transmitter coil by either:
(i) reducing a power control operating point of the active transmitter coil, energizing the neighboring inactive transmitter coil to the reduced power control operating point, and then deenergizing the active transmitter coil; or
(ii) simultaneously deenergizing the active transmitter coil and energizing the neighboring inactive transmitter coil.

6. The inductive charging system of claim 2, wherein the electrical parameters comprise at voltages, currents, or inductances of two neighboring active transmitter coils.

7. The inductive charging system of claim 6, wherein the controller is configured to monitor a ratio of the voltages, currents, or inductances of the two neighboring active transmitter coils and, when the position of the receiver coil moves away from a midline between the two neighboring active transmitter coils, the controller is configured to deactivate a distal one of the two neighboring active transmitter coils.

8. The inductive charging system of claim 1, wherein the controller is further configured to:
prior to the charging session, perform a ping operation on each of the plurality of transmitter coils to identify at least one of the plurality of transmitter coils having high levels of inductive coupling; and
initiating the charging session by activating the at least one identified transmitter coil from the ping operation.

9. The inductive charging system of claim 1, wherein the predetermined configuration is a linear, overlapping arrangement of the plurality of transmitter coils.

10. An inductive charging method, comprising:
providing a plurality of transmitter coils arranged in a predetermined configuration and each being configured to, when active, inductively transfer power to a receiver coil of a wireless device; and
controlling, by a controller, a charging session during which power is inductively transferred from at least one of the plurality of transmitter coils to the receiver coil of the wireless device, including:
monitoring, by the controller, electrical parameters of at least two transmitter coils of the plurality of transmitter coils, wherein the at least two monitored transmitter coils comprise at least one active transmitter coil;
based on the monitoring, determining, by the controller, a position of the receiver coil relative to the plurality of transmitter coils; and
at least one of selectively activating and deactivating, by the controller, at least one of the plurality of transmitter coils based on the monitoring when the position of the receiver coil changes to provide uninterrupted inductive power transfer.

11. The inductive charging method of claim 10, wherein the electrical parameters comprise voltages at the at least two transmitter coils, and wherein the method comprises monitoring, by the controller, the voltages of one active transmitter coil and one neighboring inactive transmitter coil.

12. The inductive charging method of claim 11, wherein the monitoring of the voltages of the one active transmitter coil and the one neighboring inactive transmitter coil is based on a three-winding transformer model that also takes into account electrical parameters of the receiver coil.

13. The inductive charging method of claim 12, further comprising temporarily reducing, by the controller, a magnitude of the inductive power transfer to the receiver coil for a period to temporarily decrease a current of the receiver coil to zero to avoid error in the determining of the receiver coil position.

14. The inductive charging method of claim 11, wherein based on the monitoring, deactivating, by the controller, the active transmitter coil and activating, by the controller, the neighboring inactive transmitter coil is performed by either:
(i) reducing a power control operating point of the active transmitter coil, energizing the neighboring inactive transmitter coil to the reduced power control operating point, and then deenergizing the active transmitter coil; or
(ii) simultaneously deenergizing the active transmitter coil and energizing the neighboring inactive transmitter coil.

15. The inductive charging method of claim 11, wherein the electrical parameters comprise at voltages, currents, or inductances of two neighboring active transmitter coils.

16. The inductive charging method of claim 15, wherein the monitoring comprises monitoring, by the controller, a ratio of the voltages, currents, or inductances of the two neighboring active transmitter coils and, when the position of the receiver coil moves away from a midline between the two neighboring active transmitter coils, deactivating, by the controller, a distal one of the two neighboring active transmitter coils.

17. The inductive charging method of claim 10, further comprising:
prior to the charging session, performing, by the controller, a ping operation on each of the plurality of transmitter coils to identify at least one of the plurality of transmitter coils having high levels of inductive coupling; and
initiating the charging session by activating the at least one identified transmitter coil from the ping operation.

18. The inductive charging method of claim 10, wherein the predetermined configuration is a linear, overlapping arrangement of the plurality of transmitter coils.

19. An inductive charging system, comprising:
a plurality of transmitter coil means arranged in a predetermined configuration and each for, when active, inductively transferring power to a receiver coil means of a wireless device means; and
a controller means for controlling a charging session during which power is inductively transferred from at least one of the plurality of transmitter coil means to the receiver coil means of the wireless device means, including:
monitoring electrical parameters of at least two transmitter coil means of the plurality of transmitter coil means, wherein the at least two transmitter coil means comprise at least one active transmitter coil means;
based on the monitoring, determining a position of the receiver coil means relative to the plurality of transmitter coil means; and
at least one of selectively activating and deactivating at least one of the plurality of transmitter coil means based on the monitoring when the position of the receiver coil means changes to provide uninterrupted inductive power transfer.

20. The inductive charging system of claim 19, wherein the electrical parameters comprise voltages at the at least two transmitter coil means, and wherein the controller means is configured to:
monitor the voltages of one active transmitter coil means and one neighboring inactive transmitter coil means; and
based on the monitoring, deactivate the active transmitter coil means and activate the neighboring inactive transmitter coil means by either:
(i) reducing a power control operating point of the active transmitter coil means, energizing the neighboring inactive transmitter coil means to the reduced power control operating point, and then deenergizing the active transmitter coil means; or
(ii) simultaneously deenergizing the active transmitter coil means and energizing the neighboring inactive transmitter coil means.

* * * * *